United States Patent [19]

Herbst

[11] 4,373,114
[45] Feb. 8, 1983

[54] METHOD AND MEANS OF READING PUNCHED DATA TAPE

[75] Inventor: Wayne R. Herbst, Northbrook, Ill.

[73] Assignee: Teletype Corporation, Skokie, Ill.

[21] Appl. No.: 64,257

[22] Filed: Aug. 6, 1979

[51] Int. Cl.³ ............................ G06K 7/10; G08C 9/06
[52] U.S. Cl. ................................. 178/17 D; 235/455;
340/146.3 AG
[58] Field of Search ....................... 178/17 D; 235/455;
340/146.3 AG; 250/555, 566, 568, 569, 206

[56] References Cited

U.S. PATENT DOCUMENTS

| | | | |
|---|---|---|---|
| 3,549,867 | 12/1970 | Malone | 235/455 |
| 3,560,751 | 2/1971 | Buettner et al. | 235/455 |
| 3,820,068 | 6/1974 | McMillin | 235/455 |
| 4,162,408 | 7/1979 | Hansen | 340/146.3 AG |
| 4,243,876 | 1/1981 | Engel et al. | 235/455 |

Primary Examiner—Thomas A. Robinson
Attorney, Agent, or Firm—J. C. Albrecht; A. A. Tirva

[57] ABSTRACT

A photoelectric circuit for reading punched data tape wherein the circuit compensates for variations in phototransistors and light emitting diodes, dust accumulation and degradation of the light emitting diodes by comparing the light transmitted through a punched section of the tape to the light transmitted through a solid section of the tape.

3 Claims, 2 Drawing Figures

FIG. I

METHOD AND MEANS OF READING PUNCHED DATA TAPE

TECHNICAL FIELD

This invention relates to an improved method and improved apparatus for determining the data contents of punched paper data tape.

BACKGROUND ART

Punched data tape is used for the control of communications, computing and process control apparatus. Such tape is prepared by a punch assembly which is controlled to create selected sets of holes in "data word locations" which are transverse to the length of the tape and the data content of such data word locations are determined by a reader assembly. Each such transverse set of holes comprises a parallel data word.

Paper data tape has sprocket holes throughout its length and it is advanced through the punch and reader assemblies by sprocket wheels in those assemblies. The sprocket wheels are stepped in increments such that the tape is advanced a distance equal to the distance between successive data word locations. The tape is momentarily stopped at each possible data word location to facilitate processing (punching and reading). The tape drive mechanism in the punch and reader assemblies provides timing signals for control of the punch and reader assemblies.

Paper data tape naturally has great variations in opacity and upon occasion a foreign substance, e.g. grease, contacts the tape and substantially reduces the opacity of the web. Such variation causes difficulty in accurately reading the information stored in the tape. Typically, prior art circuits utilize reference voltages which are set for a standard opacity of tape web. Such circuits have limited margins and require adjustment.

DISCLOSURE OF THE INVENTION

In accordance with the present invention, the problems of the prior art are avoided by a reading circuit which compares a percentage of the current which occurs in a light sensor when a data word location is being read to the current which occurs when a web portion of the tape covers the sensor and the reading circuit generates output signals corresponding to the data which is read.

THE DRAWINGS

FIG. 1 is a schematic block diagram of one channel of apparatus for reading paper data tape; and FIG. 2 illustrates signals which are present in the circuit of FIG. 1.

DETAILED DESCRIPTION

Figure 1:
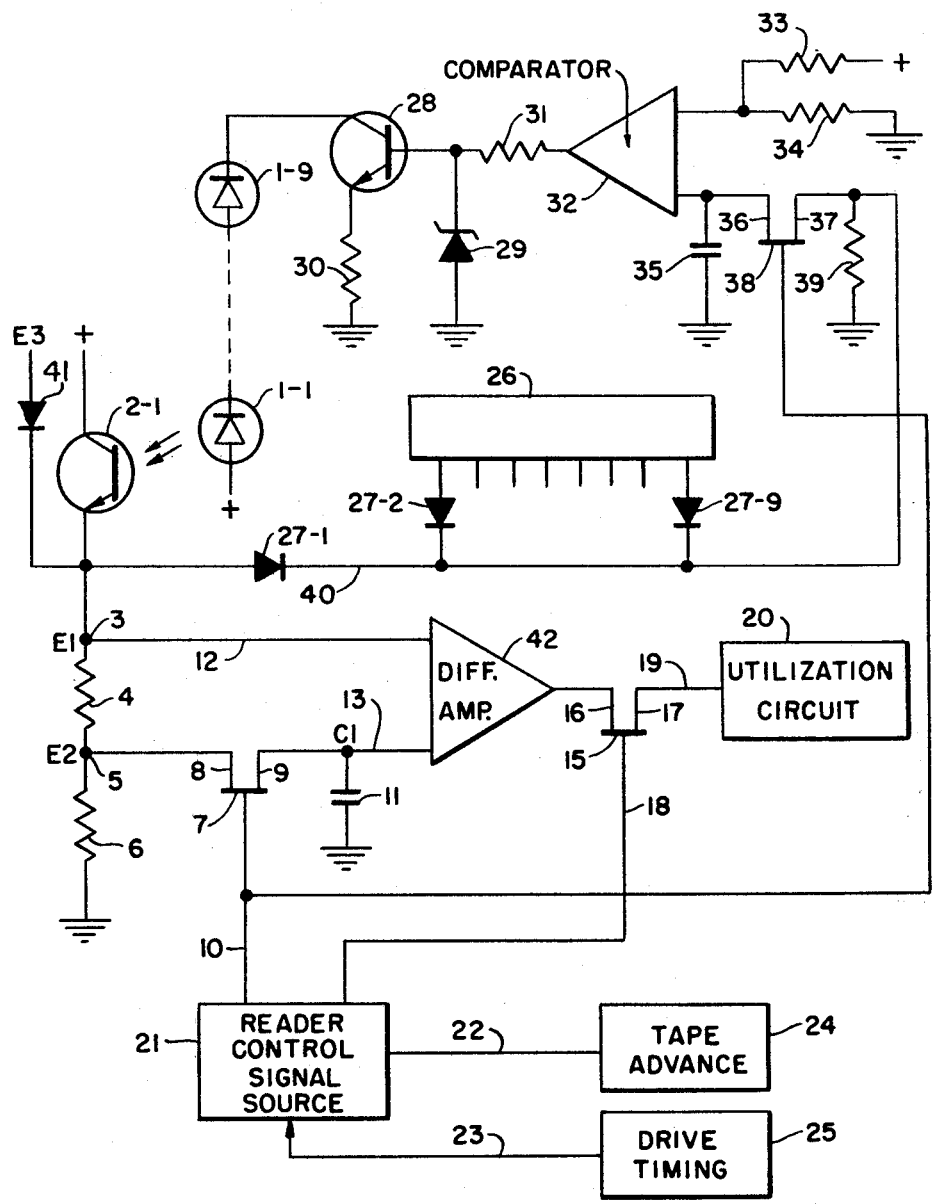

The circuit of FIG. 1 comprises light emitting diodes 1-1 through 1-9 and light responsive transistors (phototransistors) 2-1 through 2-9 (only the phototransistor 2-1 is shown) which are placed respectively opposite one another at a location herein called the "data reading position" of a punched paper data tape reader. The paper tape is periodically advanced through the reader and is momentarily brought to rest such that a "data word location" of the tape is in alignment with the "data reading position". The output of this circuit arrangement is transmitted via a gate 15 to a utilization circuit 20 wherein the data which is obtained in parallel from the punched paper tape is interpreted.

Figure 2:
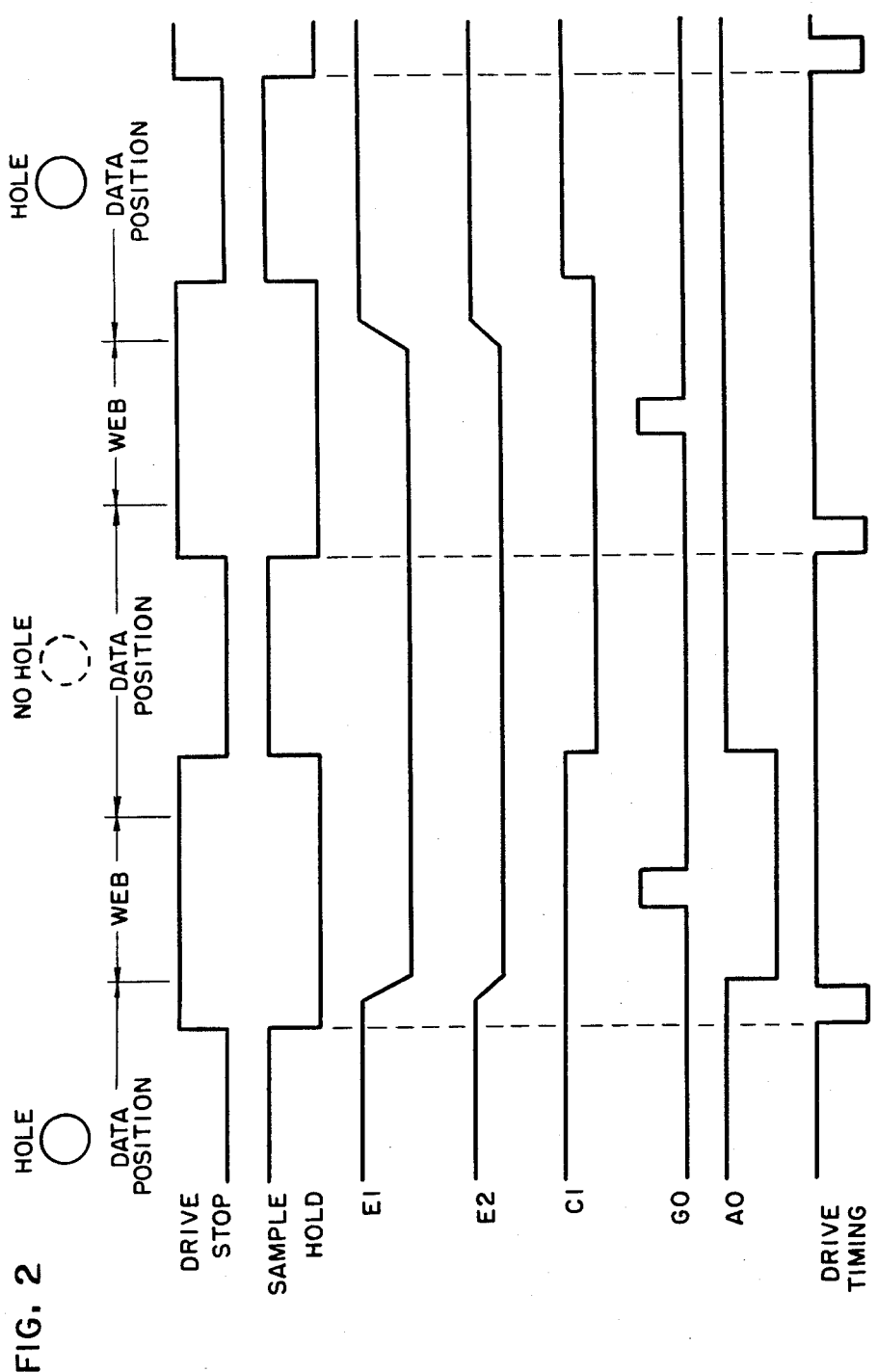

In FIG. 2 there are shown the signals which occur at the designated portions of FIG. 1 for the various conditions which occur in the reading of the punched data tape.

In FIG. 1 the light emitting diodes 1-1 through 1-9 and the phototransistors 2-1 through 2-9 (only the phototransistor 2-1 is shown) are located at the data reading position of the reader and are spaced apart in aligned relationship to permit the punched paper data tape to be controllably moved between them. The light emitting diodes 1-1 through 1-9 are connected in series and are powered by a transistor 28. As explained elsewhere herein, the current through the nine diodes 1-1 through 1-9 is controlled such that the one of the phototransistors 2-1 through 2-9 with the highest output is held just out of saturation. The positive source of potential connected to the collector of the light sensitive transistor 2-1 has a current path to ground potential through the transistor 2-1 and resistors 4 and 6. The magnitude of the current flowing through the path is proportional to the amount of light from the light emitting diode 1-1 which impinges on the phototransistor 2-1. The resistors 4 and 6 form a voltage divider and the potential at nodes 3 and 5 are designated E1 and E2 respectively. The variations of the voltages E1 and E2 for different data conditions in the portion of the tape being read are shown in FIG. 2.

In practice, the information content of a data word position of a paper data tape is determined by the circuit of FIG. 1 as described below herein.

The drive signal for the paper tape is, as shown in FIG. 2, at the "stop" level when a data word position of the tape is opposite the data reading position of the reader. In FIG. 2, the first data position is shown to be a hole in the tape. Therefore, light passes from the light emitting diode 1-1 to the phototransistor 2-1 with little or no loss other than that which occurs in the spreading of the beam from the light emitting diode 1-1. While a data word position of a tape is at rest at the data reading position of the reader, a "sample" control signal generated by a reader control signal source 21 on conductor 10 is in the "high" or active state. With this signal condition on the conductor 10, a transistor 7 is turned on and the potential E2 which is present at node 5 is transmitted through the transistor 7 to a storage capacitor 11. At this time the potential E1 at node 3 is as shown at the left side of FIG. 2. Although the E1 and E2 signals are thus simultaneously applied to two conductors 12 and 13 which form the input to a differential amplifier 42, there is no information transmitted to the utilization circuit 20 since the signal on conductor 18 (labeled "GO" in FIG. 2) is in the "low" state and the transistor 15 is in a non-conductive state.

When the drive signal becomes active and the data position of the tape is advanced by tape advance control circuit 24 beyond the data reading position, the web of the tape will exclude from the phototransistor 2-1 light from the light emitting diode 1-1. As shown in FIG. 2, the voltage E1 at node 3 will drop substantially to a value near ground and the signal AO on conductor 16 will correspondingly drop. While the drive pulse generated by a drive timing circuit 25 is in the drive condition, the signal GO on the conductor 18 will momentarily rise and the signal AO on the conductor 16 will be gated through the transistor 15 to the utilization circuit 20 during the time that the signal GO is in the high state.

As seen in FIG. 2, when a data position of the tape which is without a hole is advanced to the data reading position, the voltage E2 at node 5 will be at the same low level that occurred when the web was opposite the data reading position, and thus a signal C1 transferred to the capacitor 11 will be a low level signal. As previously described, when the drive signal again goes high and the web of the tape enters the data reading position, the signal E1 at node 3 will be low. Under these signal conditions the signal AO at the output of the differential amplifier 42 will go high and that high signal will be transmitted to the utilization circuit 20 under the control of the signal GO on the conductor 18.

Subsequently, a new data position of the tape will enter the data reading position and an output signal corresponding to the state of the tape (hole or no hole) will effect the corresponding output signal at the output of the differential amplifier 42 and thus at input 19 of the utilization circuit 20.

A diode 27-1 senses the voltage level at the phototransistor 2-1 and diodes 27-2 through 27-9 are used to sense the voltage levels at the phototransistors 2-2 through 2-9 (not shown individually but represented in the drawing as block 26). The voltage of the phototransistor with the highest voltage level is applied to a comparator 32 via a transistor 38 during the time when the "sample" control signal on the conductor 10 is in the high state. This voltage, which is stored on capacitor 35, is compared to a reference voltage applied to the comparator 32 via a voltage divider consisting of resistors 33 and 34. If the voltage applied via the transistor 38 is higher or lower than the reference voltage, comparator 32 adjusts the current through the light emitting diodes 1-1 through 1-9 via a resistor 31, transistor 28, and resistor 30 until the applied voltage equals the reference voltage or the maximum current through diodes 1-1 through 1-9 is reached. The maximum current value is established by a Zener diode 29 and the resistor 30. When the tape is advanced, the "sample" control signal reverts to the low state causing the transistor 38 to turn off and the applied voltage to be stored on the capacitor 35 thus maintaining the current flow through the light emitting diodes 1-1 through 1-9.

A diode 41 connected to the emitter of the phototransistor 2-1 supplies a bias voltage E3 to the differential amplifier 42 via the conductor 12 when the tape being read is very opaque and the voltage E1 drops below voltage E3. When the tape being read is more transparent, the voltage E1 is positive with respect to voltage E3 and, therefore, no bias is supplied.

In summary, the reading circuit of this invention is insensitive to reasonable variations in the opacity of punched data tape since the content of each data position is compared to the immediately succeeding web in the tape.

What is claimed is:

1. An arrangement for reading data stored in punched data tape which has a plurality of data positions along the length of the tape and webs of unpunched areas joining the successive data positions comprising: means for defining a reading position, means for periodically advancing the tape such that the data locations of the tape are brought into registration with said reading position; a source of light arranged to impinge upon the portion of said tape in said reading position, a light sensor assembly at said reading position to receive from said source light which passes through said tape, and means for generating output signals defining the presence and absence of holes at the data locations of said tape;

CHARACTERIZED IN THAT:

said means for generating output signals comprises: a voltage divider for generating first and second voltage signals each proportional to the amount of light impinging upon a corresponding light sensor, said second potential being less than said first potential; means for generating a Sample Hold signal when a data location of the punched data tape is in said reading position and a Go signal when a web portion of the tape is in said reading position, means for storing an analogue voltage signal, a first connecting means responsive to said Sample Hold signal for connecting the second voltage signal of said voltage divider to said storing means; a differential amplifier for generating an output signal at an output terminal thereof in accordance with the magnitudes of voltages applied to first and second input terminals thereof; means connecting the first voltage signal of said voltage divider to the first input terminal of said differential amplifier; and means connecting said storing means to the second input terminal of said differential amplifier; a utilization circuit for utilizing information obtained from said punched data tape, and a second connecting means responsive to said Go signal for connecting the output of said differential amplifier to the said utilization circuit when the input to the first input terminal of said differential amplifier is a first voltage signal corresponding to the opacity of the web immediately following a data location and the input to the second terminal of said differential amplifier is a second voltage signal from said storage means.

2. A method of detecting the data content of the data locations of a punched tape comprising:
(a) generating first and second voltage signals corresponding to the data content of a data location, said second voltage signals each being a defined percentage of corresponding ones of said first voltage signals, said first and second voltage signals being first and second values for one data content and third and fourth lower values for the opposite data content;
(b) storing said second voltage signals for each data location;
(c) generating third voltage signals corresponding to the opacity of said tape at non-data locations; each of said third voltage signals having a value greater than said fourth value and less than said second value of a corresponding stored second signal;
(d) comparing said stored signals and the corresponding ones of said third signals and generating a first output signal if said stored signal is less than said third signal and a second opposite output signal if said stored signal is greater than said third signal.

3. A method of detecting the data content of each of a plurality of data locations on a punched tape wherein the data content at each location is defined by a presence or absence of holes punched transversely to the length of the tape in predetermined segments of the tape at each data location, the method comprising:

moving the tape periodically so that a data location is positioned in a reading assembly having a light source positioned on one side of the tape and having a plurality of light sensors positioned on the opposite side of the tape for receiving from said source light which passes through said segments of the tape, generating a plurality of first voltage signals corresponding to the presence or absence of holes in each segment of the tape at a data location, generating a plurality of second voltage signals corresponding to said first voltage signals, each second voltage signal being a defined percentage of corresponding ones of said first voltage signals, storing said second voltage signals for said data location, generating a plurality of third voltage signals corresponding to the opacity of segments of the tape in a non-data location immediately following said data location, comparing each stored second voltage signal with a corresponding third voltage signal and generating a first output signal if said stored signal is less than said third signal and generating a second output signal if said stored signal is greater than the corresponding third signal.

* * * * *